ved Nov. 17, 1970

United States Patent Office
3,541,129
Patented Nov. 17, 1970

1

3,541,129
PROCESS FOR THE PREPARATION
OF ACRYLONITRILE
Keisho Yamada, Sumio Umemura, and Kyoji Odan, Ube-shi, Japan, assignors to Ube Industries, Ltd., Ube-shi, Yamaguchi-ken, Japan, a corporation of Japan
No Drawing. Filed Aug. 3, 1967, Ser. No. 658,029
Claims priority, application Japan, Aug. 12, 1966, 41/52,568
Int. Cl. C07c 121/32
U.S. Cl. 260—465.3                                           7 Claims

ABSTRACT OF THE DISCLOSURE

A process for the preparation of acrylonitrile by contacting a mixture composed of propylene, ammonia and oxygen with a molybdenum-containing catalyst in the vapor phase, characterized in that the catalyst consists essentially of molybdenum, bismuth, antimony and oxygen at the percentile atom ratio of the three components of Mo: 5–60%, Bi: 25–70% and Sb: 5–70%.

---

This invention relates to a process for the preparation of acrylonitrile by ammoxidation of propylene. More particularly the invention relates to a process for the preparation of acrylonitrile which comprises contacting propylene, ammonia and oxygen with a ternary catalyst system composed of molybdenum, bismuth and antimony at the percentile atom ratio of the three components of Mo: 5–60%, Bi: 25–70% and Sb: 5–70%, at high temperatures and in the vapor phase.

Concerning the preparation of acrylonitrile by vapor phase oxidation of propylene with oxygen or air in the presence of ammonia, viz., so-called ammoxidation of propylene, many proposals have already been made, most of which, however, proposed to perform the ammoxidation in the presence of catalysts with accompanying undesirable side reactions taking place considerably. That is, because such side reactions as formation of acetonitrile or prussic acid by splitting of propylene or formation of carbon monoxide or dioxide by combustion of propylene taking place at high ratios, the yield of the object acrylonitrile is lowered. For example, according to the disclosures of U.S. Pat. No. 2,904,580, in case of ammoxidation of propylene using bismuth phosphomolybdate-containing catalyst, the conversion to acrylonitrile is 33.2%, while that to acetonitrile, 3.2%. When the by-product is formed at such high quantities, besides the decrease in the acrylonitrile yield, there occurs another disadvantage in that the industrial scale production of high purity acrylonitrile by separation and removal of the by-product becomes difficult.

We engaged in laborious researches in the search for a catalyst which can inhibit such side reactions and at the same time can produce acrylonitrile with high yield with good selectivity, to find that a catalyst system containing as the essential three components molybdenum, bismuth and antimony at the specified quantitative ratios can, when employed in the ammoxidation of propylene, inhibit the formation of side reaction products such as acetonitrile, propionitrile, prussic acid, acrolein, carbon monoxide and carbon dioxide to extremely minute quantities, and also assist the formation of acrylonitrile at very high yield.

The catalyst to be used in the invention contains, as the essential metallic components, molybdenum, bismuth and antimony, at the percentile atom ratio of the three components (the number of atoms of each of the three metals to total number of atoms of the metals molybdenum, bismuth and antimony, expressed in percentage)

2 of Mo: 5–60%, Bi: 25–70% and Sb: 5–70%, inter alia, Mo: 5–45%, Bi: 50–70% and Sb: 5–45%. Catalysts having the compositions within the above-specified ranges possess excellent selectivity for acrylonitrile formation and inhibit the formation of the by-products to the minimum level. Absence of any one of the above three essential components impairs the selectivity of the catalyst and invites decrease of the acrylonitrile yield.

The said three components may be present in the catalyst independently of each other as oxides, or they may take a form of solid solution or heteropoly-acid salt such as bismuth heteropolymolybdate and/or heteropolyantimonate.

Conventionally, bismuth salt of phosphorus- or arsenic-molybdic acid having been used as the catalyst for ammoxidation of propylene, in case phosphorus or arsenic is present in the catalyst at the ratio exceeding the chemical equivalent as the heteropoly-acid salt, the excessive portion takes the form of phosphoric acid, arsenic acid or arsenious acid. However, because those acids are susceptible to sublimation, they sublimate and escape during the reaction or high temperature treatment in the process of the catalyst preparation. Consequently, it is very difficult to make the phosphorus or arsenic content of the catalyst greater than the equivalent as the heteropoly-acid salt. In contrast thereto, antimony oxide does not sublimate and for this reason the catalyst of the invention may contain antimony at optional ratios, and the catalyst composition undergoes no change during the ammoxidation reaction at high temperatures and can maintain stable catalytic activity for a prolonged period.

For the preparation of the catalyst, any known method conventionally employed can be used. The starting materials for the catalyst preparation are subject to no specific limitation as to their forms, which may be used in the form of molybdenum, bismuth and antimony metals, oxides, or salts thereof such as nitrates, halogenides or ammonium molybdate, so far as the treating method is suited to cause the presence of the compound or compounds of the foregoing three elements as well as oxygen in the product catalyst. The difference in the forms of the starting materials little affects the activity and selectivity of the catalyst prepared.

The catalyst of the invention may be carried on any known suitable carrier at an optional ratio.

Also the catalyst may contain such other elements normally contained in minor quantities in the conventional catalysts for ammoxidation of propylene as, for example, phosphorus, arsenic, boron, sulfur, tellurium, vanadium, tin, cerium and lanthanum, in the form of oxide or other compound in minor quantities. For instance the catalyst may contain up to 3% by weight to the catalyst of such oxides without adverse effect on the catalytic activity.

The catalyst of the invention can be used either in fluidized bed or fixed bed, the latter being particularly advantageous because the catalyst has long life.

The grain size of the catalyst neither is particularly limited, and that can be determined by the form of the catalyst, either in fluidized bed or fixed bed. Also the catalyst can be imparted with the desired level of mechanical strength by conventionally employed shaping procedures which in no way affect the catalytic activity.

The invention relates, therefore, to a process for the preparation of acrylonitrile with high yield, by catalytic reaction of propylene with ammonia and oxygen and/or air at high temperatures in the vapor phase, in the presence of the catalyst prepared as in the above.

The starting propylene to be used in the invention is not necessarily required to be of high purity, but may contain, for example saturated hydrocarbons such as propane, but other unsaturated hydrocarbons such as butylene, butadiene and acetylene should be well removed for they become the cause of unnecessary side reactions.

As the oxygen source, use of high purity oxygen is not necessarily required, but from economical reasons normally air is used. The supply ratio of oxygen to propylene ranges appropriately 0.8–5 mol times, inter alia, 1.0–2.0 mol times.

Again the supply ratio of ammonia to propylene preferably ranges 0.2–3.0 mol times, particularly 0.5–1.0 mol times.

Furthermore, addition of nitrogen, carbon dioxide, steam and the like as a diluent gas is also permissible. Because steam has, besides the function as a diluent, the effects of improving the reactivity of propylene and making the catalytic activity more durable, it is advantageous to add steam in an amount of 1 mol time or more to the propylene. Presence of sulfur compound in the feed gas does not damage the catalyst, but presence of chloride may convert antimony in the catalyst to antimony chloride which is fugaceous and apt to be lost. For this reason, presence of chloride in the feed gas should be avoided if at all possible.

The reaction temperature suitably ranges 400°–600° C., inter alia, 420°–520° C.

The preferred contact time ranges 0.1–50 seconds, inter alia, 0.3–20 seconds.

The reaction is normally performed at atmospheric pressure, but slightly elevated or reduced pressures are likewise usable.

Now the invention will be explained more specifically with respect to working examples, in which the yield and reactivity are determined as follows:

$$\text{Yield } (\%) = \frac{\text{mol number of product compound}}{\text{mol number of consumed propylene}} \times 100$$

$$\text{Reactivity} = \frac{\text{mol number of consumed propylene}}{\text{mol number of supplied propylene}} \times 100$$

EXAMPLE 1

In an evaporating dish, 21.3 g. of ammonium molybdate, 14.7 g. of antimony trichloride and 31.2 cc. of water were mixed and stirred well, and the mixture was gradually heated with agitation to paste form. To the paste then 13.1 cc. of 28% aqueous ammonia was added, and the heating was continued with agitation until the system became dry solid and furthermore the ammonium chloride escaped from the system by sublimation. Then the system was let cool off and was added with a solution formed of 89.3 g. of bismuth nitrate and 14 cc. of 50% nitric acid dissolved in 40 cc. of water, and again heated to dryness with agitation. The heating was continued until the generation of brown gas of nitrogen oxide ceased. After the following cooling off, the system was made pasty with addition of 30 cc. of water, and heated under mild conditions to dryness. The resultant solid was ground to uniformalized grain size of 10–20 meshes (Tyler's standard sieve) and calcined for 16 hours at 540° C. Thus prepared catalyst contained molybdenum, bismuth and antimony at the composition of expressed in percentile atom ratio of the three components, Mo: 32.5%, Bi: 50%, and Sb: 17.5%. Seventeen (17) g. of the same catalyst was packed in a stainless steel U-shaped reaction tube having an inner diameter of about 15 mm., and the tube was placed in a salt bath (potassium nitrate and sodium nitrile) so as to maintain the inside temperature of the reaction tube at 470° C.

A gaseous mixture having a composition in terms of mol ratio of propylene:ammonia:air:steam=1:1:5:1 was passed through the reaction tube at the flow rate of 80 cc./min. (contact time: 7.5 seconds) to be reacted. From the analysis results of the resultant reaction product (by gas chromatography and chemical analysis), it was confirmed that the reactivity of propylene was 59.7%, and the yields of the formed products were as given in Table 1 below.

TABLE 1

| Product: | Yield, percent |
|---|---|
| Acrylonitrile | 91.2 |
| Acetonitrile | 6.0 |
| Prussic acid | 0.6 |
| Carbon monoxide | 1.2 |
| Carbon dioxide | 9.9 |

Furthermore, the formation of acrolein and propionitrile were only traces.

EXAMPLES 2–21

Propylene was subjected to ammoxidation under the same reaction conditions as described in Example 1, using the catalysts prepared in the same manner as described in Example 1 except that the ratio of molybdenum, bismuth and antimony in the catalyst was varied each time. The results are given in Table 2. The reactivity in all cases was about 50%.

TABLE 2

| Example No. | Percentile atom ratio of the three components, percent | | | Yield, percent | | | | |
|---|---|---|---|---|---|---|---|---|
| | Mo | Bi | Sb | Acrylo-nitrile | Aceto-nitrile | Prussic acid | Carbon monoxide | Carbon dioxide |
| 2 | 40 | 50 | 10 | 85.6 | 4.5 | 2.1 | 0.0 | 16.2 |
| 3 | 35 | 55 | 10 | 86.1 | 6.7 | 5.4 | 0.0 | 16.2 |
| 4 | 30 | 65 | 5 | 84.3 | 7.5 | 0.0 | 3.4 | 18.0 |
| 5 | 30 | 55 | 15 | 90.2 | 5.1 | 1.5 | 0.0 | 17.7 |
| 6 | 25 | 62.5 | 12.5 | 91.6 | 4.8 | 0.6 | 1.2 | 9.9 |
| 7 | 25 | 55 | 20 | 86.0 | 9.6 | 5.1 | 0.0 | 11.7 |
| 8 | 25 | 50 | 25 | 88.0 | 6.1 | 5.1 | 0.0 | 11.7 |
| 9 | 20 | 50 | 30 | 81.7 | 5.0 | 0.0 | 0.0 | 35.1 |
| 10 | 15 | 65 | 20 | 83.1 | 5.1 | 0.3 | 6.0 | 23.1 |
| 11 | 13 | 61 | 26 | 81.0 | 5.5 | 0.6 | 3.3 | 36.6 |
| 12 | 10 | 55 | 35 | 80.5 | 6.7 | 2.1 | 9.3 | 33.6 |
| 13 | 10 | 50 | 40 | 78.2 | 10.5 | 0.0 | 3.0 | 36.0 |
| 14 | 55 | 25 | 20 | 76.3 | 12.3 | 10.8 | 0.0 | 4.5 |
| 15 | 50 | 40 | 10 | 75.2 | 10.5 | 0.9 | 12.0 | 30.0 |
| 16 | 45.5 | 30 | 24.5 | 72.6 | 4.7 | 3.3 | 0.0 | 36.0 |
| 17 | 35 | 30 | 35 | 70.6 | 7.7 | 3.3 | 0.6 | 36.0 |
| 18 | 25 | 40 | 35 | 73.7 | 10.0 | 0.3 | 0.3 | 35.1 |
| 19 | 21 | 30 | 49 | 70.5 | 4.4 | 3.3 | 0.0 | 25.4 |
| 20 | 15 | 35 | 50 | 70.5 | 7.6 | 2.7 | 18.0 | 45.0 |
| 21 | 7 | 30 | 63 | 75.5 | 6.8 | 5.1 | 9.3 | 30.6 |

From the results of Table 2 above, it can be understood that the use of catalyst containing molybdenum, bismuth and antimony at the percentile atom ratio of the three components of Mo: 5–45%, Bi: 50–70% and Sb: 5–45% is particularly preferred for improving the acrylonitrile yield.

EXAMPLES 22–26

Using the catalyst employed in Example 2 and the reaction vessel employed in Example 1, a gaseous mixture having a composition in terms of mol ratio of propylene:ammonia:air:steam=1:1:5:2 was reacted with the contact time of 3.8 seconds at varied reaction temperatures. The reaction temperatures and the yields of the products were as given in Table 3.

TABLE 3

| Ex. No. | Reaction temp., °C. | Yield, percent | | | | |
|---|---|---|---|---|---|---|
| | | Acrylo-nitrile | Aceto-nitrile | Prussic acid | Carbon monoxide | Carbon dioxide |
| 22 | 431 | 84.0 | 12.7 | 1.0 | 5.1 | 14.1 |
| 23 | 450 | 89.5 | 6.6 | 0.3 | 3.3 | 8.4 |
| 24 | 471 | 88.5 | 5.4 | 0.0 | 2.7 | 15.7 |
| 25 | 490 | 92.0 | 1.5 | 0.0 | 15.9 | 5.4 |
| 26 | 520 | 75.2 | 16.6 | 0.0 | 15.6 | 25.2 |

EXAMPLES 27-32

Using the catalyst employed in Example 2 and the reaction apparatus used in Example 1, a gaseous mixture having a composition in terms of mol ratio of propylene: ammonia:air:steam=1:1:5:2 was reacted at the reaction temperature of 470° C. with the contact time varied each time. The contact times and the yields of the products were as given in Table 4.

TABLE 4

| Ex. No. | Contact time (sec.) | Yield, percent | | | | |
|---|---|---|---|---|---|---|
| | | Acrylo-nitrile | Aceto-nitrile | Prussic acid | Carbon monoxide | Carbon dioxide |
| 27 | 0.606 | 89.5 | 4.3 | 0.0 | 6.0 | 12.9 |
| 28 | 0.741 | 88.0 | 5.1 | 0.0 | 0.0 | 21.0 |
| 29 | 0.834 | 89.2 | 3.9 | 0.0 | 0.0 | 21.0 |
| 30 | 1.110 | 90.3 | 4.0 | 0.3 | 2.7 | 14.4 |
| 31 | 1.660 | 88.4 | 4.0 | 0.0 | 2.7 | 21.0 |
| 32 | 3.33 | 84.0 | 5.1 | 1.5 | 1.5 | 20.4 |

EXAMPLE 33

Into a minor amount of diluted hydrochloric acid, 16.7 g. of crystalline antimony trichloride was dissolved, and the solution was hydrolyzed by the addition of one liter of water. In order to complete the hydrolysis, further 250 cc. of diluted aqueous ammonia was added and the system was boiled for 10 minutes. By separating the solid in the system by means of decantation and washing the solid with water, an antimony oxide paste was obtained. To the paste 49.7 g. of ammonium molybdate powder was added and then a minor amount of water, and the system was heated with agitation. Furthermore a solution formed of 101.3 g. of crystalline bismuth nitrate and 15.9 cc. of 60% nitric acid dissolved in 40 cc. of water was added to the system while the heating was continued until the system became dry and generation of nitrogen oxide gas ceased. Thus obtained solid was ground and granulated, and calcined for 18 hours at 540° C. The resultant catalyst contained molybdenum, bismuth and antimony at the percentile atom ratio of the three components of Mo: 50%, Bi: 37% and Sb: 13%.

When the ammoxidation of propylene was carried out using the catalyst prepared as in the above under the same reaction conditions as employed in Example 1, the reactivity was 55% and the yields of the reaction products were as in Table 5.

TABLE 5

| Product: | Yield, percent |
|---|---|
| Acrylonitrile | 90.9 |
| Acetonitrile | 6.1 |
| Prussic acid | 0.6 |
| Carbon monoxide | 0.0 |
| Carbon dioxide | 15.0 |

EXAMPLE 34

Propylene was subjected to ammoxidation under the same reaction conditions as of Example 1, using a catalyst prepared in the similar manner as described in Example 33 having a composition of Mo, Bi and Sb at the percentile atom ratio of the three components of Mo: 40%, Bi: 55% and Sb: 5%. The reactivity was 51% and yields of the reaction products were as in Table 6.

TABLE 6

| Product: | Yield, percent |
|---|---|
| Acrylonitrile | 94.5 |
| Acetonitrile | 0.0 |
| Prussic acid | 0.3 |
| Carbon monoxide | 2.7 |
| Carbon dioxide | 13.5 |

EXAMPLE 35

To a mixture of 26.5 g. of molybdenum trioxide powder and 14.5 g. of antimony trioxide powder, a solution formed of 58.8 g. of bismuth nitrate and 9.2 cc. of 60% nitric acid dissolved in 60 cc. of water was added, and the system was heated to dryness with thorough agitation. The heating was further continued until the generation of nitrogen oxide gas ceased, and the remaining solid was ground and granulated, followed by a calcination for 16 hours of 540° C. to make the catalyst. The composition of Mo, Bi and Sb in the catalyst was, in terms of percentile atom ratio of the three components, Mo: 45.5%, Bi: 30% and Sb: 24.5%.

Propylene was subjected to the ammoxidation under the same reaction conditions as employed in Example 1, using the above catalyst. The reactivity was 56% and the yields of the reaction products were as given in Table 7.

TABLE 7

| Product: | Yield, percent |
|---|---|
| Acrylonitrile | 72.0 |
| Acetonitrile | 6.0 |
| Prussic acid | 11.4 |
| Carbon monoxide | 19.2 |
| Carbon dioxide | 37.0 |

EXAMPLES 36-38

Catalysts mere prepared by adding to the catalyst used in Example 1 each 1.5% by weight of phosphorus, arsenic and boron respectively as $P_2O_5$, $As_2O_3$ and $B_2O_3$. Using those catalysts, propylene was subjected to the ammoxidation under the same reaction conditions as employed in Example 1. The results are given in Table 8.

TABLE 8

| Example No. | Additive | Yield, percent | | | | |
|---|---|---|---|---|---|---|
| | | Acrylo-nitrile | Aceto-nitrile | Prussic acid | Carbon monoxide | Carbon dioxide |
| 36 | Phosphorus | 94.1 | 5.7 | 3.0 | 3.3 | 0.0 |
| 37 | Arsenic | 89.8 | 6.0 | 3.3 | 3.3 | 12.0 |
| 38 | Boron | 91.8 | 5.4 | 2.7 | 0.0 | 10.2 |

CONTROLS 1-4

Catalysts of which metallic components were molybdenum and bismuth, or molybdenum and antimony were prepared in about the same manner of preparation to that for the catalyst used in Example 1. Using the resultant catalyst, propylene was subjected to the ammoxidation under the same reaction conditions as of Example 1. The results are given in Table 9.

TABLE 9

| Control No. | Percentile atom ratio of the two components, percent | | | Reaction temp., °C. | Contact time, sec. | Yield, percent | | | | |
|---|---|---|---|---|---|---|---|---|---|---|
| | Mo | Bi | Sb | | | Acrylo-nitrile | Aceto-nitrile | Prussic acid | Carbon monoxide | Carbon dioxide |
| 1 | 36.4 | 64.6 | | 480 | 13.9 | 55.4 | 24.5 | 0.3 | 0.0 | 81.3 |
| 2 | 36.4 | 64.6 | | 481 | 11.1 | 60.8 | 15.7 | 0.3 | 3.3 | 82.6 |
| 3 | 33.3 | | 66.7 | 473 | 13.9 | 56.2 | 35.0 | 12.9 | 4.8 | 51.0 |
| 4 | 33.3 | | 66.7 | 473 | 11.1 | 56.5 | 32.7 | 14.7 | 5.1 | 56.2 |

From the results of above Table 9 and Table 2, it is apparent that the catalyst of the invention containing the three components of molybdenum, bismuth and antimony at the specified quantitative ratio is markedly superior to the conventional catalysts containing the two components of molybdenum and bismuth, or molybdenum and antimony with respect to acrylonitrile yield.

We claim:

1. A process for the preparation of acrylonitrile which comprises reacting a mixture composed of propylene, ammonia, and oxygen in the presence of a solid oxidation catalyst in the vapor phase at an elevated temperature, characterized in that said solid oxidation catalyst is prepared by mixing and heating ammonium molybdate with antimony trichloride or antimony oxide, mixing the resulting mixture with bismuth nitrate, heating the resulting mixture until the generation of nitrogen oxide gas ceases, and calcining the resulting composition, wherein the ratio of the ammonium molybdate, antimony trichloride, or antimony oxide, and bismuth nitrate is, expressed in terms of the percentile atomic ratio of the three components, Mo: 5–60%; Bi: 25–70%; and Sb: 5–70%.

2. The process of claim 1 wherein the ratio of the ammonium molybdate, antimony trichloride or antimony oxide, and bismuth nitrate is, expressed in terms of the percentile atomic ratio of the three components, Mo: 5–45%; Bi: 50–70%; and Sb: 5–45%.

3. The process of claim 1 wherein said solid oxidation catalyst additionally contains a component selected from $P_2O_5$, $As_2O_3$, and $B_2O_3$ in an amount of up to 3% by weight based on the weight of said catalyst.

4. The process of claim 1 in which the mixture of propylene, ammonia and oxygen is contacted with the catalyst together with a non-reactive diluent gas.

5. The process of claim 4 in which the non-reactive diluent gas is steam.

6. The process of claim 1 in which the mixture of propylene, ammonia and oxygen is contacted with the catalyst at the temperatures ranging 400–600° C.

7. A process for the preparation of acrylonitrile which comprises reacting a mixture composed of propylene, ammonia, and oxygen in the presence of a solid oxidation catalyst in the vapor phase at an elevated temperature, characterized in that said solid oxidation catalyst is prepared by mixing molybdenum trioxide and antimony trioxide, adding the resulting mixture to bismuth nitrate and reacting by heating until the generation of nitrogen oxide gas ceases, and calcining the resulting composition, wherein the ratio of molybdenum trioxide, antimony trioxide, and bismuth nitrate is, expressed in terms of the percentile atomic ratio of the three components, Mo: 5–60%, Bi: 25–70%, and Sb: 5–70%.

References Cited

UNITED STATES PATENTS

| | | | |
|---|---|---|---|
| 2,904,580 | 9/1959 | Idol | 260—465.3 |
| 3,321,507 | 5/1967 | Ginnasi et al. | 260—465.3 |
| 3,328,315 | 6/1967 | Callahan et al. | 260—465.3 XR |
| 3,338,952 | 8/1967 | Callahan et al. | 260—465.3 |
| 3,346,617 | 10/1967 | Hiroki et al. | 260—465.3 |

FOREIGN PATENTS 243,315  7/1960  Australia.

JOSEPH PAUL BRUST, Primary Examiner